United States Patent
Lee

(10) Patent No.: US 10,427,621 B2
(45) Date of Patent: Oct. 1, 2019

(54) VEHICLE TETHER CLIP

(71) Applicant: Seoyon E-Hwa Co., Ltd., Seoul (KR)

(72) Inventor: Hyung Mok Lee, Asan-si (KR)

(73) Assignee: Seoyon E-Hwa Co., Ltd., Seoul (KR)

( * ) Notice: Subject to any disclaimer, the term of this patent is extended or adjusted under 35 U.S.C. 154(b) by 0 days.

(21) Appl. No.: 15/648,805

(22) Filed: Jul. 13, 2017

(65) Prior Publication Data

US 2018/0099623 A1    Apr. 12, 2018

(30) Foreign Application Priority Data

Oct. 12, 2016  (KR) ........................ 10-2016-0132183

(51) Int. Cl.
| | |
|---|---|
| *B60R 13/02* | (2006.01) |
| *B60R 21/216* | (2011.01) |
| *F16B 2/04* | (2006.01) |
| *F16B 2/22* | (2006.01) |
| *B60R 21/213* | (2011.01) |

(52) U.S. Cl.
CPC ........ *B60R 13/0206* (2013.01); *B60R 21/216* (2013.01); *F16B 2/04* (2013.01); *F16B 2/22* (2013.01); *B60R 21/213* (2013.01)

(58) Field of Classification Search
CPC . B60R 13/0206; B60R 21/216; B60R 21/213; F16B 2/04; F16B 2/22
See application file for complete search history.

(56) References Cited

U.S. PATENT DOCUMENTS

2005/0071959 A1*  4/2005  Minnich ............. B60R 13/0206
24/297

FOREIGN PATENT DOCUMENTS

| JP | 2012153188 A | 8/2012 |
| KR | 20-1998-0053369 U | 10/1998 |
| KR | 10-2010-0042526 | 4/2010 |
| KR | 10-2013-0068534 | 6/2013 |

OTHER PUBLICATIONS

KIPO Search Report from KR 10-2016-0132183, dated Oct. 16, 2017.

\* cited by examiner

*Primary Examiner* — Robert Sandy
(74) *Attorney, Agent, or Firm* — Harness, Dickey & Pierce, P.L.C.

(57) ABSTRACT

Disclosed herein is a vehicle tether clip which enables the coupling of latch jaws (13*a*) to a mounting hole of a pillar panel to be easily released by fastening a male screw member (30) to female screw holes (14) formed in hooks (13). Accordingly, the maintenance of the tether clip can be improved and the tether clip can be reused since the tether clip is not damaged during disassembly thereof.

9 Claims, 8 Drawing Sheets

- Prior Art -

- Prior Art -

VEHICLE TETHER CLIP

BACKGROUND OF THE INVENTION

Field of the Invention

Exemplary embodiments of the present invention relate to a vehicle tether clip, and more particularly, to a vehicle tether clip capable of catching a front pillar trim completely separated from a front pillar to scatter into a vehicle interior when a curtain airbag is deployed.

Description of the Related Art

In recent years, curtain airbags have been increasingly applied to cope with vehicle side impacts, in addition to existing airbags installed in front of driver and passenger seats.

A curtain airbag is installed inside a roof above a door glass and is deployed to cover the door glass, thereby enabling occupants to be protected from side impacts and broken fragments of the door glass.

However, since a portion of the front of the curtain airbag is installed in the interior of a front pillar, a front pillar trim (hereinafter, referred to as a "pillar trim") must be separated from a front pillar panel (hereinafter, referred to as a "pillar panel") to normally deploy the curtain airbag.

In addition, it is necessary to prevent the pillar trim from being completely separated from the pillar panel in order to prevent secondary injuries of occupants due to impact of the pillar trim springing when the curtain airbag is deployed.

Accordingly, there is used a tether clip to ordinarily maintain a state in which the pillar trim is completely fixed to the pillar panel and to separate the pillar trim from the pillar panel by an appropriate distance while they are connected to each other when the curtain airbag is deployed.

A conventional vehicle tether clip includes a base member 3 and a sliding member 4 which are coupled to each other, as illustrated in FIGS. 1 and 2.

The base member 3 is inserted into a mounting hole formed in a pillar panel 2 to be fixed to the pillar panel by latching of a hook 3a formed on the side of the base member 3.

The sliding member 4 is coupled to a coupling bracket 1a formed on the inner surface of a pillar trim 1 using a coupling groove 4b formed in the lower edge of the sliding member 4. The sliding member 4 is coupled to the pillar trim 1 by inserting and latching a coupling end 1b of the coupling bracket 1a into the coupling groove 4b.

In the above coupling state, the base member 3 is inserted into the sliding member 4 and a latching protrusion 3b of the base member 3 is inserted and latched into a latching groove 4a of the sliding member 4 so that the base member 3 is coupled to the sliding member 4. Thus, it is possible to maintain a state in which the pillar trim 1 is fixed to the pillar panel 2.

The latching protrusion 3b is decoupled from the latching groove 4a when a curtain airbag is deployed in the event of collision accidents. Subsequently, the sliding member 4 is latched to a latching end 3c formed at the end thereof while moving along the guide plate of the base member 3, and is then maintained in this state.

When the curtain airbag is deployed by the above operation, the pillar trim 1 is separated from the pillar panel 2 so that they may be maintained in a state in which they are spaced apart from each other. Accordingly, it is possible to prevent secondary injuries of occupants due to scattering of the pillar trim 1 since the pillar trim 1 does not disturb the deployment of the curtain airbag and does not scatter toward the occupants.

Meanwhile, in order to easily decouple the base member 3 from the pillar panel 2 when it is intended to separate the pillar trim 1 from the pillar panel 2 as occasion demands, the hook 3a has release operation pieces 3d protruding from the ends thereof to facilitate the release operation of the hook 3a.

However, it is very difficult to push and operate the release operation pieces 3d formed at both sides of the base member 3 by hand because the distance between the pillar trim 1 and the pillar panel 2 spaced from each other is small (in the state in which the base member 3 is primarily decoupled from the sliding member 4 and the sliding member 4 is latched to the latching end 3c of the base member 3). Hence, there is a problem of poor maintenance.

Accordingly, operators use a method of breaking the base member 3 with tools such as pliers and removing the base member 3 from the pillar panel 2, but there is a problem in that consumption of parts increases since the base member 3 is not reusable.

Meanwhile, the guide plate of the base member 3 has an unnecessary inner portion that does not function at all to guide the movement of the sliding member 4 when the curtain airbag is deployed, wherein the inner portion is a portion except for the edge portion of the guide plate including the latching end 3c.

As such, since the conventional tether clip has the release operation pieces 3d and the unnecessary portion such as the inner portion of the guide plate, there is a problem in that the consumption of material is increased during manufacture and the cost to manufacture parts is increased.

PATENT DOCUMENT (Patent Document 1) Korean Patent Application Publication No. 2010-0042526

(Patent Document 2) Korean Patent Application Publication No. 2013-0068534

SUMMARY OF THE INVENTION

An object of the present invention is to provide a vehicle tether clip capable of having high maintenance and achieving a reduction in consumption and a reduction in cost to manufacture since the usage of material is reduced during manufacture.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a vehicle tether clip includes a base part including a pair of hooks having latch jaws that are inserted and latched into a mounting hole of a pillar panel, a sliding part coupled to the base part and mounted to a coupling bracket of a pillar trim, and female screw holes formed through the hooks.

The vehicle tether clip may further include a male screw member screwed to the female screw holes such that the hooks are close to each other in order to release a state in which the latch jaws of the hooks are coupled to the mounting hole of the pillar panel.

Each of the female screw holes may have a plurality of thread portions circumferentially spaced apart from each other on an inner peripheral surface thereof, and the thread portions may have threads formed thereon.

The base part may include a guide passing through an inner through-hole of the sliding part, the guide may have a lathing end formed at a lower end thereof, and the sliding part may have a latching jaw protruding from the inner through-hole thereof such that the latching jaw of the sliding part is latched to the latching end.

The guide may be hollow therein, except for both rectilinear portions and the latching end connecting ends of the rectilinear portions.

The sliding part may have opening portions formed in surfaces thereof corresponding to the hooks in order to insert a tool into the female screw holes and avoid interference between a head of the male screw member and the sliding part.

The opening portions may be open to an upper end of the sliding part in order to avoid interference between the head of the male screw member and the sliding part when the base part is coupled to the sliding part.

The sliding part may have a coupling groove formed along an outer edge thereof for coupling with the coupling bracket of the pillar trim.

The sliding part may have an elastic support piece to elastically push a portion around the mounting hole of the pillar panel.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Figure 1:
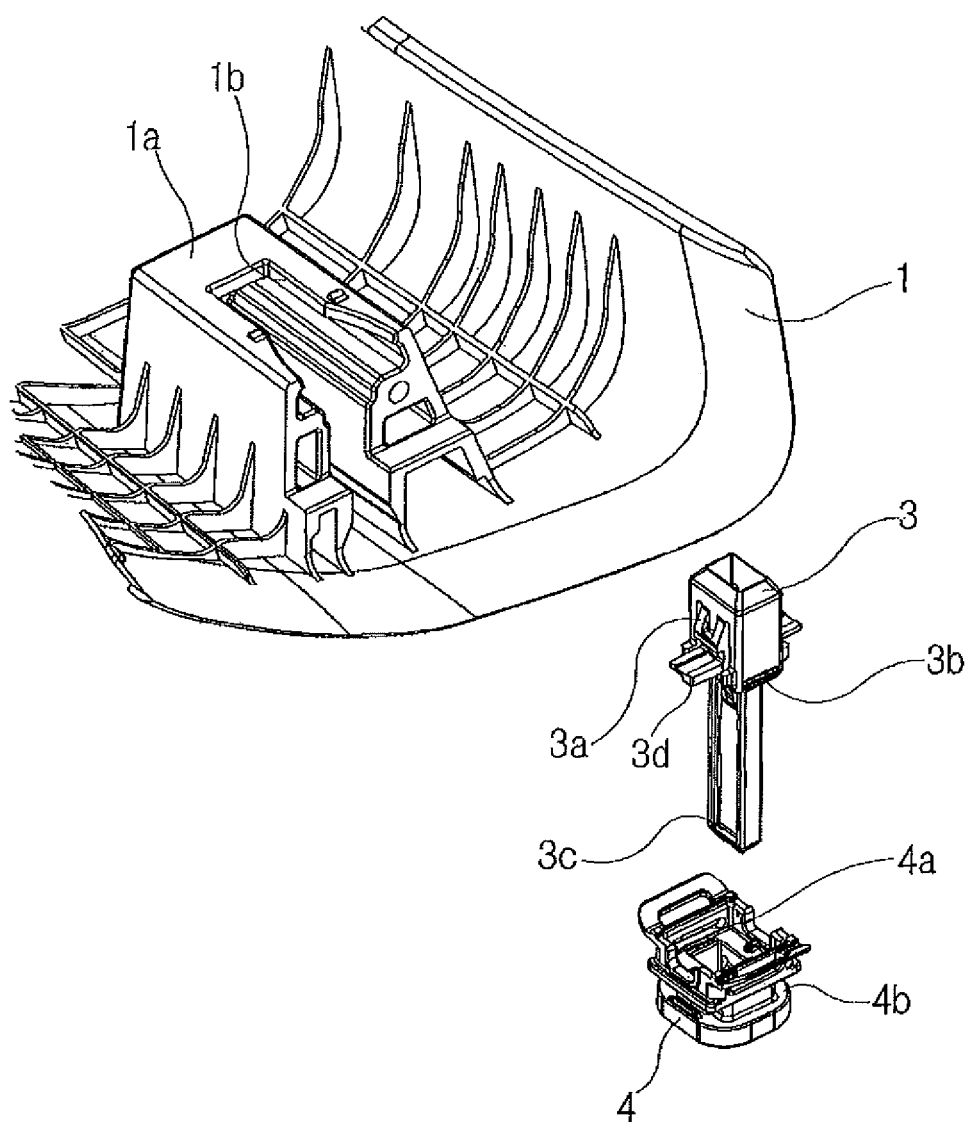
FIG. 1 is an exploded perspective view illustrating a pillar trim and a conventional tether clip.
Figure 2:
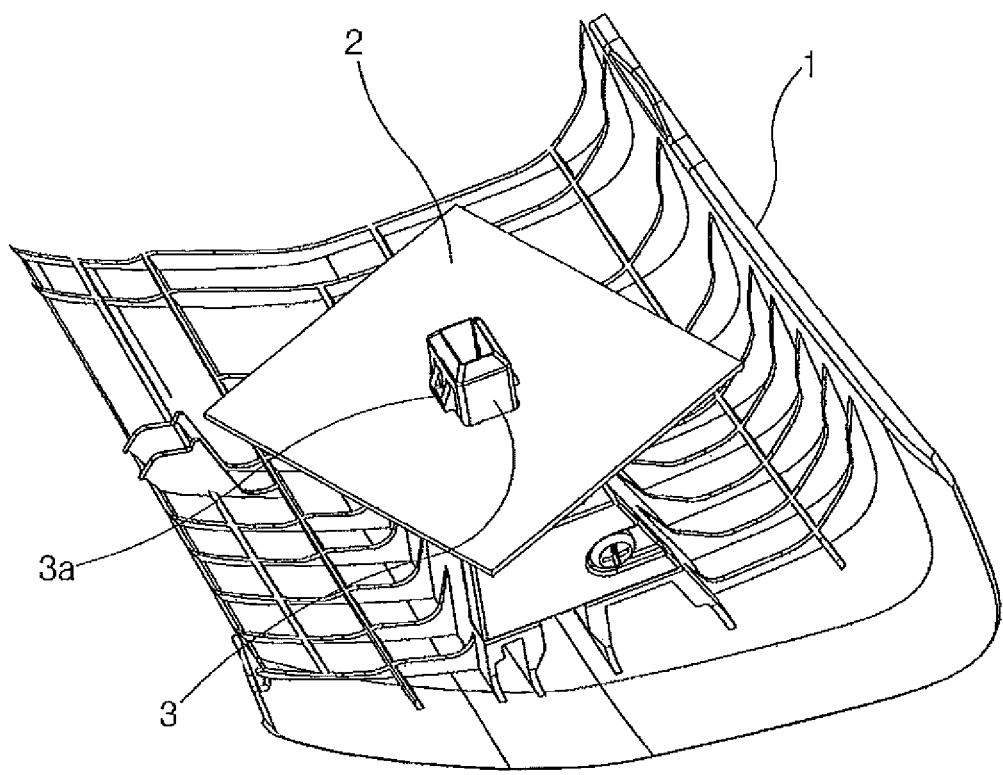
FIG. 2 is a view illustrating a state in which the pillar trim is coupled to a pillar panel by the conventional tether clip.
Figure 3:
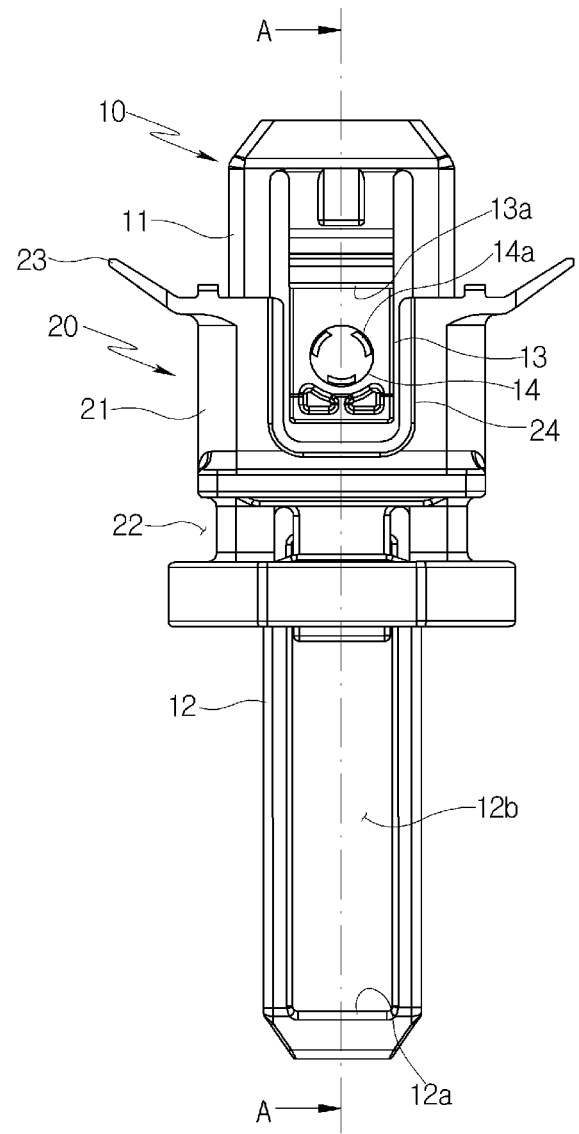
FIG. 3 is a front view illustrating an assembly state of a vehicle tether clip according to an embodiment of the present invention.
Figure 4:
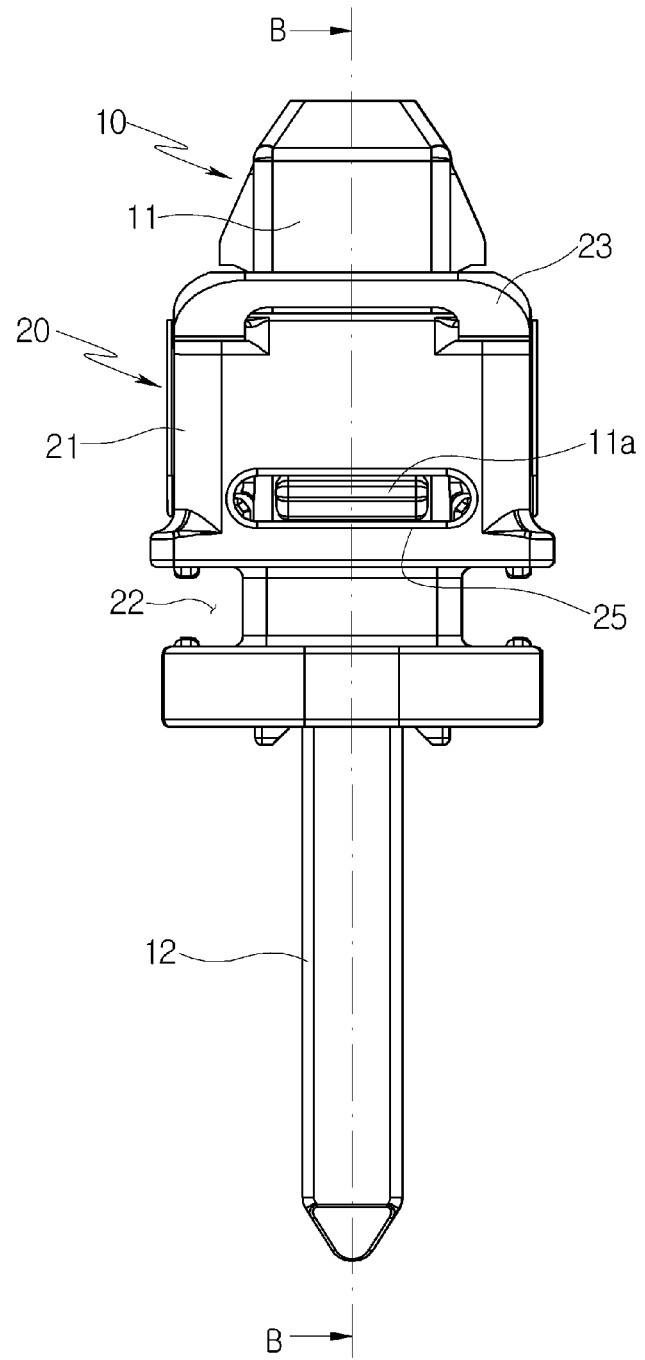
FIG. 4 is a side view illustrating the vehicle tether clip according to the embodiment of the present invention.
Figure 5:
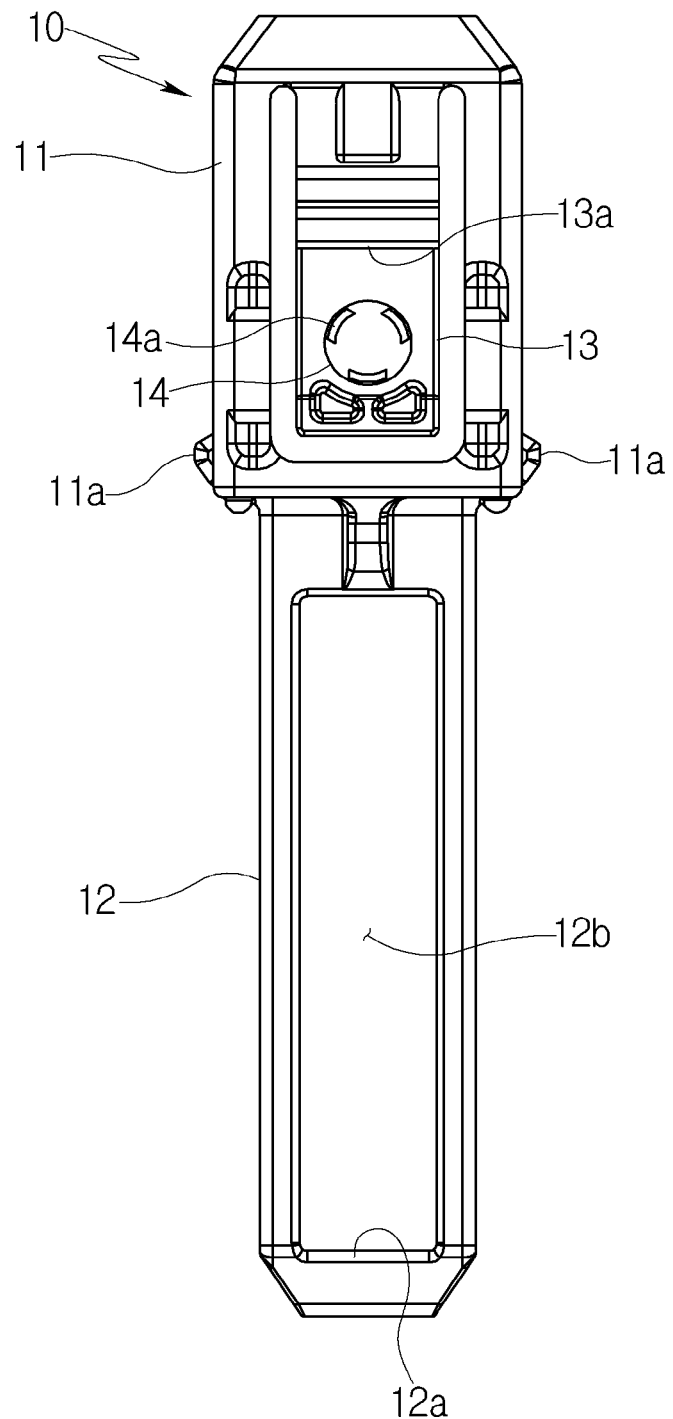
FIG. 5 is a front view illustrating a base part that is one component of the vehicle tether clip according to the embodiment of the present invention.

The present invention may be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

In addition, the terms used in the specification are terms defined in consideration of functions of the present invention, and these terms may vary with the intention or practice of a user or an operator. Therefore, these terms should be defined based on the entire content disclosed herein.

Exemplary embodiments of the present invention will be described below in more detail with reference to the accompanying drawings.

As illustrated in FIGS. 3 to 7, a vehicle tether clip according to an embodiment of the present invention includes a base part 10 and a sliding part 20 which are coupled to each other.

The base part 10 is mounted to a pillar panel, and the sliding part 20 is mounted to a pillar trim.

The base part 10 includes a body 11 that is inserted and mounted into a mounting hole of the pillar panel, and a guide 12 that elongates and protrudes from one side of the body 11 to be inserted into the sliding part 20.

The guide 12 is a U-shaped portion connected to the body 11, and includes both rectilinear portions and a latching end 12a that connects the ends of the rectilinear portions. The latching end 12a has a flat latching surface directed toward the body 11.

The guide 12 has a through-hole 12b formed therein. The through-hole 12b is formed to pass through all portions except for the rectilinear portions and the latching end 12a connecting the ends thereof in the guide 12.

Hooks 13 are formed on two facing surfaces of the body 11, and the upper ends of the hooks 12 are connected to the body 11 so that the hooks 13 are elastically pushed and operated.

The hooks 13 has latch jaws 13a that are formed at the upper intermediate portions thereof, the latch jaws 13a protruding outward of the body 11, and the latch jaws 13a have latching surfaces directed toward the guide 12. Accordingly, the latch jaws 13a are latched by the portion around the mounting hole when the body 11 is inserted into the mounting hole formed in the pillar panel, with the consequence that the base part 10 is fixed to the pillar panel since the body 11 is not decoupled from the mounting hole.

The hooks 13 have female screw holes 14 formed through the respective lower portions thereof. The female screw holes 14 of the hooks 13 have the same center line. That is, the female screw holes 14 are formed on the same line.

The female screw holes 14 have thread portions 14a that are formed therein and have threads. The thread portions 14a are formed at three positions that are circumferentially spaced at regular intervals in each of the female screw holes 14, rather than forming a single thread portion on the whole circumferential surface of each female screw hole. The thread portions 14a have the same circumferential length.

The body 11 has latching protrusions 11a protruding from the lower ends of two remaining surfaces thereof that are not formed with the hooks 13. The latching protrusions 11a are inserted and latched into latching grooves 25 of the sliding part 20 to be described later.

The sliding part 20 has a substantially container-shaped rectangular body 21, and a coupling groove 22 formed around the lower portion of the body 21. The sliding part 20 is mounted to the pillar trim so as not to be decoupled therefrom by inserting a coupling end of a coupling bracket formed in the pillar trim into the coupling groove 22 (for the coupling bracket and the coupling end, see the related art and FIG. 1).

The body 21 of the sliding part 20 has elastic support pieces 23 formed at both sides of the upper end thereof, wherein the elastic support pieces 23 protrude in an inclined state. The elastic support pieces 23 serve to come into close contact with and support the pillar panel in the installation state of the tether clip, thereby allowing the tether clip to be maintained without movement in a stably fixed state. That is, the elastic support pieces 23 of the sliding part 20 elastically and tightly support the inner surface of the pillar panel in the state in which the latch jaws 13a of the hooks 13 of the base part 10 are latched to the outer surface of the pillar panel, thereby preventing the movement of the tether clip fixed to the pillar panel.

In the assembly state of the tether clip, opening portions 24 are formed on both surfaces of the body 21 of the sliding part 20, which face the respective hooks 13 of the base part 10, to expose the hooks 13 to the outside of the tether clip. Each of the opening portions 24 has a U shape that is recessed downward from the upper end of the body 21.

The body 21 of the sliding part 20 has latching grooves 25 formed at positions corresponding to the respective latching protrusions 11a of the base part 10, wherein each of the latching grooves 25 has a transverse elongated shape. The base part 10 is coupled to the sliding part 20 in such a manner that the guide 12 of the base part 10 is inserted into the sliding part 20 and the latching protrusions 11a are inserted and latched into latching grooves 25 (see FIG. 7).

Figure 6:
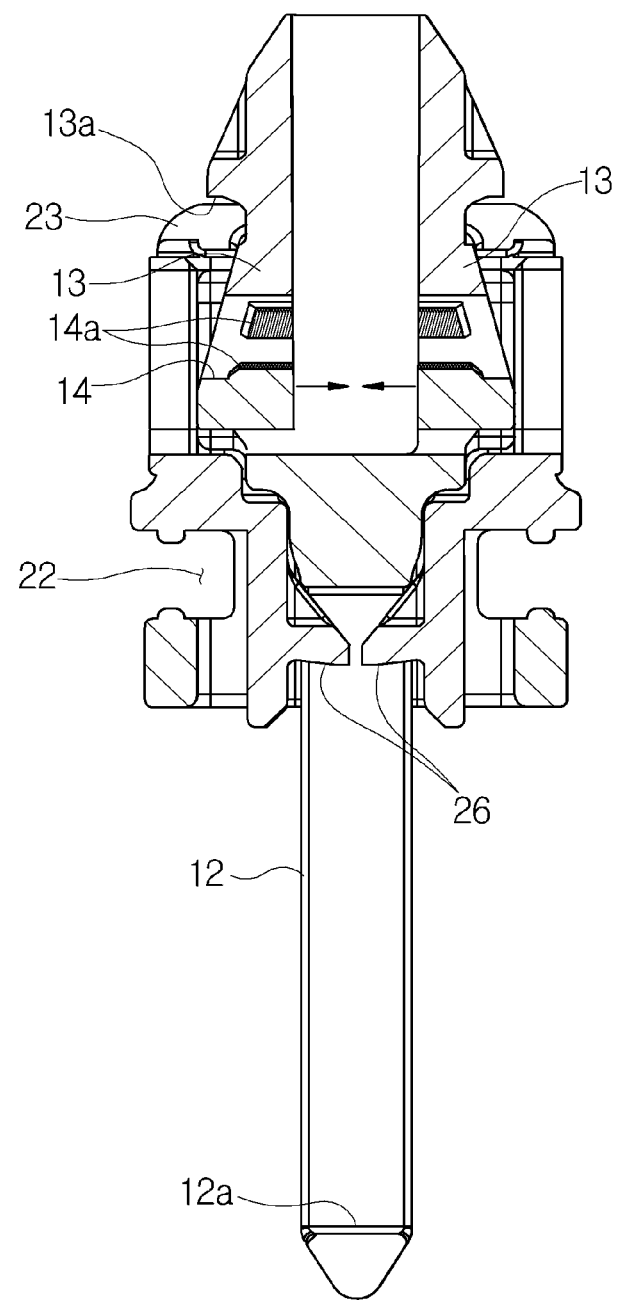
FIG. 6 is a cross-sectional view taken along line A-A of FIG. 3.
Figure 7:
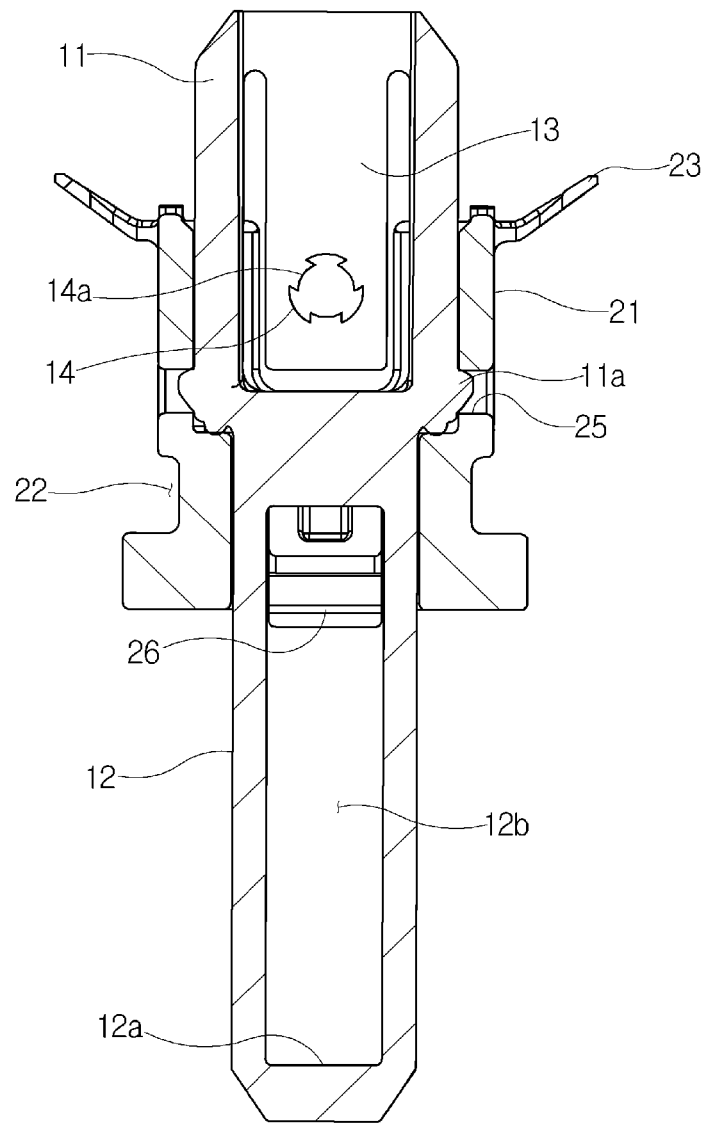
FIG. 7 is a cross-sectional view taken along line B-B of FIG. 4.

In addition, the sliding part 20 has a pair of latch jaws 26 protruding toward the center of an inner through-hole (into which the guide 12 of the base part 10 is inserted) thereof from both surfaces of the inner through-hole (see FIG. 6). The latching jaws 26 have latching surface directed toward the latching end 12a of the guide 12.

A male screw member 30 may be screwed into the female screw holes 14 formed in the hooks 13 of the base part 10. Since the male screw member 30 is always previously fastened to the female screw holes 14 in the state of use of the tether clip, the male screw member 30 may be used to decouple the base member 10 from the pillar panel later (preparation state for use). Alternatively, an operator may separately prepare and use a male screw member 30 together with a tool 40 only when the base member 10 is decoupled from the pillar panel.

Hereinafter, the operation and effect of the vehicle tether clip according to the embodiment of the present invention will be described.

As described above, when the airbag is deployed in the event of collision accidents in the use state in which the pillar trim is mounted to the pillar panel by the tether clip, the latching protrusions 11a are decoupled from the latching grooves 25 while the pillar trim springs from the mounting position thereof to the vehicle interior by the deployment/expansion force of the airbag, so that the sliding part 20 moves along the guide 12.

In this case, the sliding part 20 moves to a position at which the latch jaws 26 thereof are latched to the latch end 12a of the guide 12 of the base part 10. The sliding part 20 moves along a stable rectilinear path since the latch jaws 26 formed in the inner through-hole of the sliding part 20 are guided by the rectilinear portions of the guide 12 in the longitudinal direction thereof.

The guide 12 has a length that is set in consideration of the distance between the pillar panel and the pillar trim so as not to disturb the deployment of the curtain airbag. Thus, the curtain airbag is deployed and stretched downward through the gap between the pillar panel and the pillar trim in the vehicle interior.

Therefore, the curtain airbag can protect occupants from side impacts by normal operation.

In addition, since the sliding part 20 is not completely decoupled from the base part 10 by latching the latch jaws 26 to the latch end 12a, it is possible to prevent the pillar trim from scattering into the vehicle interior due to complete separation from the pillar panel.

Therefore, it is possible to prevent secondary injuries of occupants by the pillar trim.

Meanwhile, the tether clip according to the embodiment of the present invention is separated from the pillar panel by the following method. The hooks 13 of the base part 10 have the female screw holes 14 that are formed in the inner peripheral surfaces thereof while being formed with the thread portions 14a.

Figure 8:
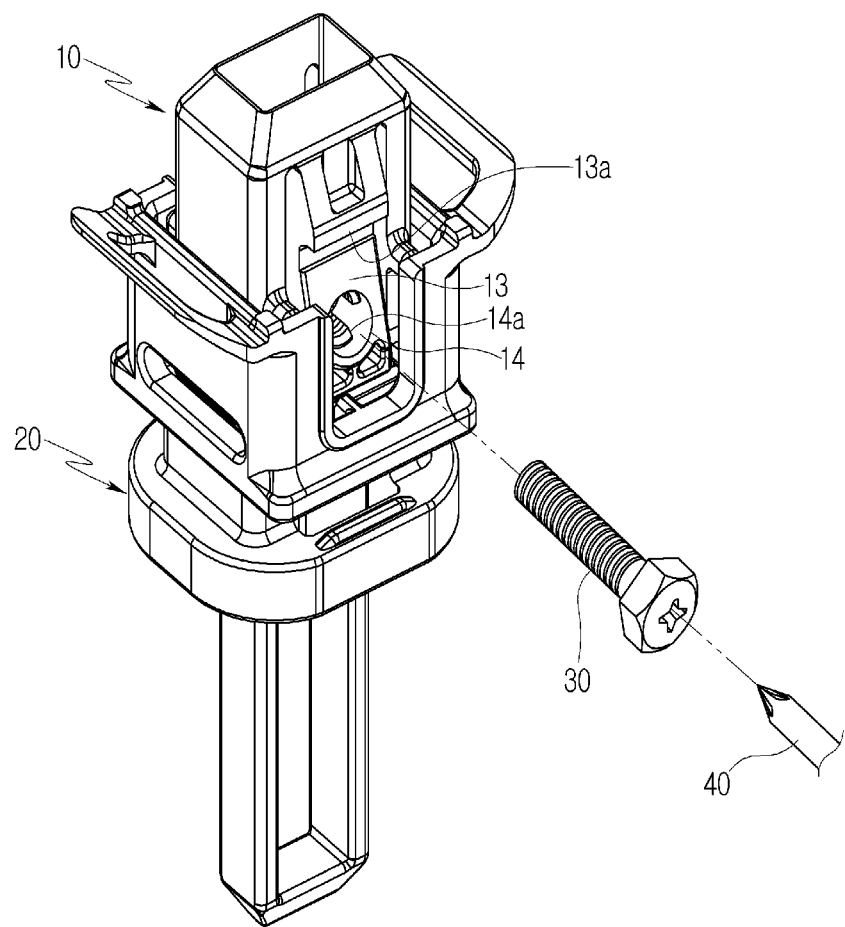
FIG. 8 is a perspective view illustrating a state of use of the vehicle tether clip according to the embodiment of the present invention.

As illustrated in FIG. 8, the operator fastens and tightens the male screw member 30 to the female screw holes 14 with the tool 40 such as a screwdriver. In this case, the male screw member 30 may be previously fastened to the female screw holes 14, or may be separately prepared at the time of separation by the operator.

The tool 40 may be inserted through the opening portions 24 formed in the sliding part 20 to tighten the male screw member 30.

In addition, the opening portions 24 serve to avoid the interference between the head of the male screw member 30 and the sliding part 20 and to normally couple the base part 10 to the sliding part 20 when the male screw member 30 is previously fastened to the female screw holes 14.

As the male screw member 30 is gradually tightened in the state in which the latch jaws 13a of the hooks 13 are latched to the outer peripheral surface of the portion around the mounting hole of the pillar panel, the hooks 13 are deformed in a direction in which they move toward each other (in a direction indicated by the arrow of FIG. 6 and directed toward the inner center of the base part 10) by the screwing of the male screw member 30 to the thread portions 14a.

Accordingly, since the latch jaws 13a formed in the hooks 13 also move inward of the base part 10, the latch jaws 13a are not latched to the portion around the mounting hole of the pillar panel any more, thereby decoupling the base part 10 from the pillar panel.

When the base part 10 is decoupled from the pillar panel, the pillar trim is completely separated from the pillar panel. Subsequently, it is possible to easily separate and replace the pillar trim and the tether clip by decoupling the sliding part 20 from the pillar trim.

The threads are formed on the thread portions 14a formed at portions that are circumferentially spaced at regular intervals in each of the female screw holes 14, rather than forming a single thread on the whole circumferential surface of each female screw hole. Accordingly, the thread area of each of the female screw holes 14 coming into contact with the male screw member 30 is reduced, which may lead to a reduction in frictional resistance. Therefore, it is possible to easily fasten the male screw member 30 with a smaller force. Accordingly, it is possible to more easily perform the separation of the base part 10, i.e. the separation of the pillar trim.

According to the embodiment of the present invention, it is possible to easily release the hooks 13 by tightening the male screw member 30 to the female screw holes 14 formed in the hooks 13, and to thus separate the tether clip from the pillar panel.

Accordingly, it is possible to more easily perform various operations such as complete separation and removal of the pillar trim, reinstallation of the airbag, and replacement of the pillar trim, after the curtain airbag is deployed in the event of accidents. Therefore, the maintenance of the tether clip can be improved.

In addition, since there is no need to break the base part when the base part is decoupled from the pillar panel, the base part can be reused and thus the consumption of parts can be reduced.

Meanwhile, the guide 12 of the base part 10 is hollow therein, except for the rectilinear portions and the latching end 12*a* formed in the lower end thereof for performing necessary functions (that is, the guide 12 has the through-hole 12*b*).

In addition, it is unnecessary to form release operation pieces for releasing hooks in the related art.

In addition, since the tether clip is not formed with an unnecessary portion, it is possible to reduce an amount of material used to manufacture the tether clip and thus reduce the cost to manufacture.

As is apparent from the above description, since female screw holes are formed in hooks of a base part and a screw member is fastened to the female screw holes in a vehicle tether clip of the present invention, it is possible to easily operate the hooks by tightening the screw member with a screwdriver. Therefore, the maintenance of the tether clip can be improved.

In addition, since there is no need to break the base part when the base part is decoupled from a pillar panel, the base part can be reused and thus the consumption of parts can be reduced.

Furthermore, since release operation pieces of the hooks are not formed in the base part and a guide has a through-hole formed therein so that the base part does not an unnecessary portion, it is possible to reduce the usage of material and thus reduce the cost to manufacture parts.

While the present invention has been described with respect to the specific embodiments, it will be apparent to those skilled in the art that various changes and modifications may be made without departing from the spirit and scope of the invention as defined in the following claims.

What is claimed is:

1. A vehicle tether clip comprising:
   a base part comprising a pair of hooks having latch jaws that are inserted and latched into a mounting hole of a pillar panel;
   a sliding part coupled to the base part and mounted to a coupling bracket of a pillar trim; and
   female screw holes formed through the hooks.

2. The vehicle tether clip according to claim 1, further comprising a male screw member screwed to, the female screw holes such that the hooks are close to each other in order to release a state in which the latch jaws of the hooks are coupled to the mounting hole of the pillar panel.

3. The vehicle tether clip according to claim 2, wherein the sliding part has opening portions formed in surfaces thereof corresponding to the hooks in order to insert a tool into the female screw holes and avoid interference between a head of the male screw member and the sliding part.

4. The vehicle tether clip according to claim 3, wherein the opening portions are open to an upper end of the sliding part in order to avoid interference between the head of the male screw member and the sliding part when the base part is coupled to the sliding part.

5. The vehicle tether clip according to claim 1, wherein each of the female screw holes has a plurality of thread portions circumferentially spaced apart from each other on an inner peripheral surface thereof, and the thread portions have threads formed thereon.

6. The vehicle tether clip according to claim 1, wherein the base part comprises a guide passing through an inner through-hole of the sliding part, the guide has a latching end formed at a lower end thereof, and the sliding part has a latching jaw protruding from the inner through-hole thereof such that the latching jaw of the sliding part is latched to the latching end.

7. The vehicle tether clip according to claim 6, wherein the guide is hollow therein, and includes rectilinear portions and the latching end connecting ends of the rectilinear portions.

8. The vehicle tether clip according to claim 1, wherein the sliding part has a coupling groove formed along an outer edge thereof for coupling with the coupling bracket of the pillar trim.

9. The vehicle tether clip according to claim 1, wherein the sliding part has an elastic support piece to elastically push a portion around the mounting hole of the pillar panel.

* * * * *